US006868352B2

(12) United States Patent
Adewole et al.

(10) Patent No.: US 6,868,352 B2
(45) Date of Patent: Mar. 15, 2005

(54) ORGANIC SEMICONDUCTOR PRODUCT STATE MONITOR

(75) Inventors: Hakeem Adewole, Schaumburg, IL (US); Paul Brazis, South Elgin, IL (US); Daniel Gamota, Palatine, IL (US); Jie Zhang, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 20 days.

(21) Appl. No.: 10/420,616

(22) Filed: Apr. 22, 2003

(65) Prior Publication Data

US 2004/0215409 A1 Oct. 28, 2004

(51) Int. Cl.[7] .............................................. G06F 19/00
(52) U.S. Cl. .......................................... 702/81; 702/82
(58) Field of Search ........................... 340/5.92, 825.29, 340/825.36; 700/108, 109, 110, 225, 236; 702/81, 82, 83, 84, 182; 705/22

(56) References Cited

U.S. PATENT DOCUMENTS

| | | | | |
|---|---|---|---|---|
| 4,952,928 A | * | 8/1990 | Carroll et al. | 340/10.41 |
| 4,972,099 A | * | 11/1990 | Amano et al. | 382/313 |
| 5,332,315 A | * | 7/1994 | Baker et al. | 374/102 |
| 5,682,143 A | * | 10/1997 | Brady et al. | 340/572.7 |
| 5,802,015 A | * | 9/1998 | Rothschild et al. | 368/10 |
| 5,804,810 A | * | 9/1998 | Woolley et al. | 235/492 |
| 5,892,441 A | * | 4/1999 | Woolley et al. | 340/539.26 |
| 6,040,773 A | * | 3/2000 | Vega et al. | 340/572.1 |
| 6,237,051 B1 | * | 5/2001 | Collins | 710/36 |
| 6,252,508 B1 | * | 6/2001 | Vega et al. | 340/572.1 |
| 6,501,390 B1 | * | 12/2002 | Chainer et al. | 340/870.16 |
| 6,570,508 B1 | * | 5/2003 | Kvenvold | 340/870.17 |
| 6,681,990 B2 | * | 1/2004 | Van der Veen et al. | 235/385 |

FOREIGN PATENT DOCUMENTS

WO    WO 200123256 A2 *  4/2001   ........... B65B/00/00

OTHER PUBLICATIONS

Kriebel, F; Seidowski, T; "Smart Labels —High Volume Applications Using Adhesive Flip Chip Technologies"; 1st IEEE Intnl Conf on Polymers and Adhesives in Microelectronics and Photonics: 21–24 Oct. 2001; pp. 304–308.*
Kreibel, F; Seidowski, T; Galties, J; "Smart Cards and Smart Labels—High Volume Applications of Adhesive Flip–Chip Technologies"; 4the Intnl Conf on Adhesive Joining and Coating Technology in Electronics Manufacturing; 18–21 Jun. 2000; pp. 52–54.*

* cited by examiner

Primary Examiner—Michael Nghiem
Assistant Examiner—Douglas N Washburn (57) ABSTRACT

An organic semiconductor product state monitor attached to a product receives a product usefulness input, which, along with the product predetermined usefulness limit, is used to determine an indicator command to indicate a state of usefulness of the product. An organic circuit is formed and placed on a product with a power supply to control the circuit operation.

21 Claims, 6 Drawing Sheets

FIG. 6 ated by the National Institute of Standards and Technology (NIST). The United States Government has certain rights in the invention.

ORGANIC SEMICONDUCTOR PRODUCT STATE MONITOR

This invention was made with United States Government support under Agreement No. 70NANB0H3033 awarded by he National Institute of Standards and Technology (NIST). The United States Government has certain rights in the invention.

FIELD OF THE INVENTION

This invention relates generally to the determination of a usefulness of a product based on a predetermined usefulness limit for the product and the indication of the state of usefulness of the product to an observer. More specifically a circuit formed from organic semiconductor material and attached to the product senses the product usefulness, compares the product usefulness with the predetermined usefulness limit and issues an indicator command to an indicator.

BACKGROUND OF THE INVENTION

Many products sold to consumers have a limited lifetime beyond which the product value is diminished or completely gone. For example, epoxies must be used within a limited time after they are made. Beyond that limited time the epoxy loses its adhesive capability. The date beyond which the product is not useful is typically called the expiration date. Similarly, many foods must be consumed prior to an expiration date, or they will spoil. Some foods will spoil prior to the expiration date if they are not kept within a range of environmental conditions. If such a product is exposed to an environment beyond the acceptable range, for example, if it is overheated in a truck driving through a desert, it will lose the ability to perform or deliver the function that a consumer expects. Pharmaceutical products also have expiration dates beyond which the drug will not function with its maximum efficiency.

Currently, packages with time limitations are often marked with the expiration date. The date may be marked on the container or placed on a printed label, which is attached to the product. Sometimes this date is difficult to locate, unreadable or not present at all. Since some consumers expect the stores remove expired products from the shelves, they do not even look for the expiration date. However, some stores are lax in removing expired products from their shelves. There is no method currently available to determine if the product was exposed to an environment that was detrimental to the product.

It is preferable to have a small, low cost, flexible label which will sense the environment and passage of time to determine if the product useful and indicate with a highly visible light emitting diode if the product is useful to a consumer.

SUMMARY OF THE INVENTION

One aspect of the present invention provides a method of identifying a state of usefulness of a product using an organic circuit by attaching the organic circuit to a product having a predetermined usefulness limit and receiving at least one product usefulness input which is used to determine an indicator command based on the received product usefulness input and the predetermined usefulness limit and indicating the state of usefulness of the product responsive to the determined indicator command.

Another aspect of the present invention is a device to identify a state of usefulness of a product using an organic circuit, comprising a means of attaching the organic circuit to a product having a predetermined usefulness limit and means of receiving a product usefulness input. A means of determining an indicator command based on the received product usefulness input based on the received product usefulness input and the predetermined usefulness limit is part of the present invention as well as a means of indicating the state of usefulness of the product responsive to the determined indicator command.

A third aspect of the present invention provides a computer readable medium storing a computer program comprising computer readable code for receiving a predetermined usefulness limit for a product, for receiving at least one measured product usefulness input from an organic circuit, and for comparing the measured product usefulness input and the predetermined usefulness limit for a product. The computer readable code is also used for calculating a comparative value based on the comparison of the measured product usefulness input and the predetermined usefulness limit for a product and for determining an indicator command having a first value for a first range of comparative values and having a second value for a second range of comparative values.

The forgoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE PRESENTLY PREFERRED EMBODIMENT

Figure 1:
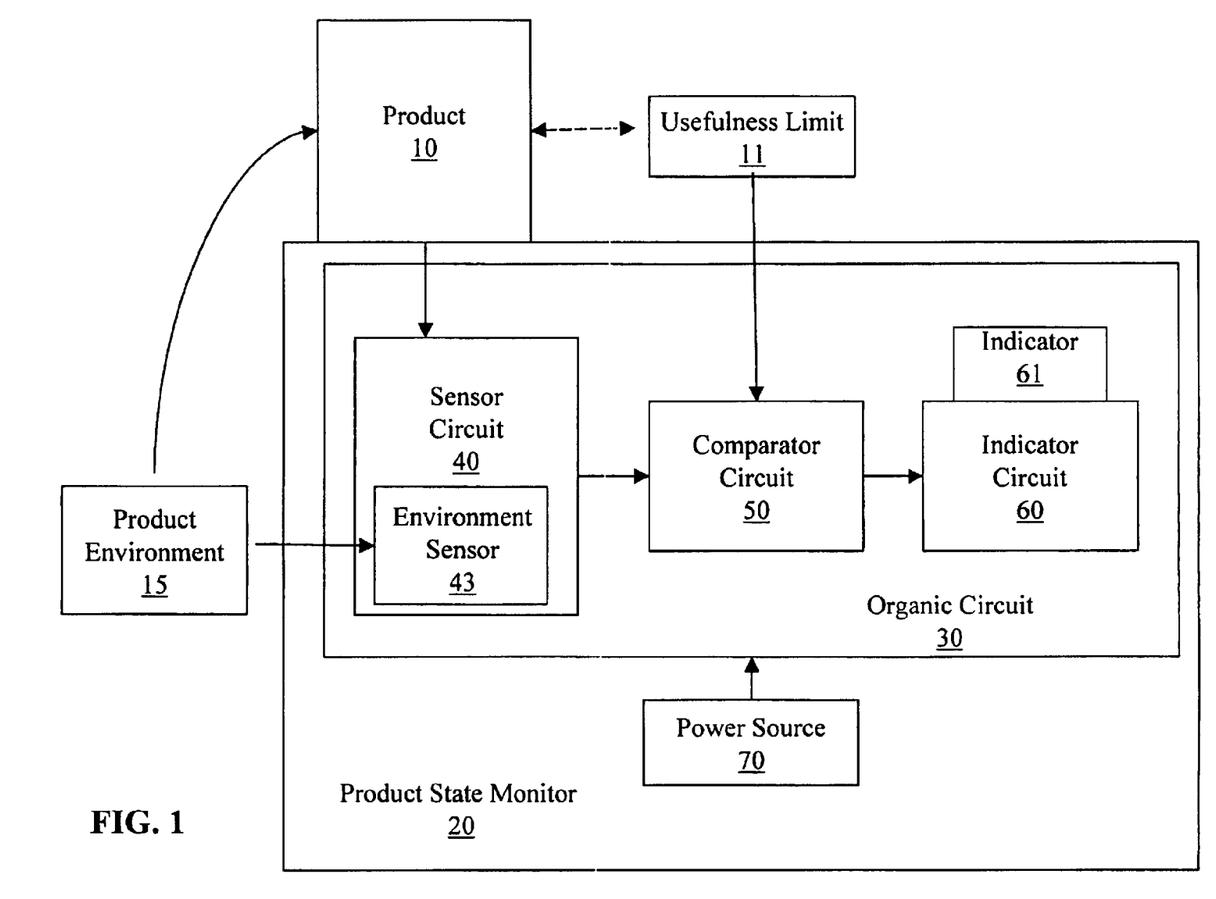
FIG. 1 illustrates in block diagram, a first embodiment of a product state monitor and product interaction.

FIG. 1 illustrates in block diagram a first embodiment of a product state monitor 20 interacting with a product 10. The various interactions within the product state monitor 20 and interactions among the product 10, the product environment 15 and the product state monitor 20 are illustrated with arrows, to indicate the flow of information between two components. The product state monitor 20 includes an organic circuit 30 comprised of a sensor circuit 40 with an environment sensor 43, a comparator circuit 50 and an indicator circuit 60 with at least one indicator 61. The product state monitor 20 also includes a power source 70, which drives the organic circuit 30.

The product 10 has a usefulness limit 11, which is known by the manufacturer or the producer of the product 10.

Illustrated in FIG. 1, the usefulness limit 11 is linked to the product 10 with a dashed double-headed arrow to indicate this connection. This usefulness limit 11 is input to the comparator circuit 50 within embedded computer readable code. The computer readable code is also operable to make comparisons of two or more values, and to determine a comparative value and issue an indicator command, which maintains or changes an indicator 61. The environment 15 provides input to the environment sensor 43 and simultaneously impacts the product 10 to which the product state monitor 20 is attached, preferably at the start of life of the product 10. The product state monitor 20 is attached to the outside of the packaging of the product or is attached so that the environment sensor 43 is in direct contact with the product 10 and the indicator 61 is outside the packaging of the product for a consumer to see.

The sensor circuit 40 is formed with one or more of a variety of environmental sensors 43 including a humidity sensor, a temperature sensor, an ultra-violet light exposure sensor, vibration or shock sensors, a pressure sensor or a sensor for particular chemical and biological species. Besides measuring the environment in which the product is located, the sensor circuit 40 can measure parameters of the product itself, which will change as the environment changes, for example, the pH of the product. In that case the environment sensor 43 must be in physical contact with the product 10 itself, rather than the outside of the product 10 package. The sensor may also be a timing circuit 41 (FIG. 2) to measure the passage of time. The sensor circuit 40 delivers a product usefulness input to the comparator circuit 50, which is based on the status of the sensor circuit 40.

The usefulness limit 11, embedded in the comparator circuit 50, is compared to the product usefulness input from the product 10, either continuously or intermittently. The comparator circuit 50 will send an indicator command to the indicator circuit 60, either continuously or intermittently, which reflects a comparative value between the product usefulness input from the sensor circuit 40 and the usefulness limit 11. When the comparative value indicates that the product 10 has been exposed to an environment beyond the acceptable limit or has been in existence too long, the indicator circuit will change the state of an indicator 61. The indicator 61 can be a visual indicator such as a I electrochromic indicator, polymer dispersed liquid crystal and polymer liquid crystal indicator but not limited to those listed above. If the indicator 61 is on when the product is useful, then the indicator circuit 60 will have the indicator 61 turn off when the product has been exposed to an environment beyond the acceptable limit or has been in existence too long. Alternately, if the indicator 61 is off when the product is useful, then the indicator circuit 60 will have the indicator 61 turn on when the product has been exposed to an environment beyond the acceptable limit or has been in existence too long. Preferably another colored indicator 61 indicates a good quality product and a red LED indicator 61 indicates a product 10, which is beyond its intended usefulness.

Figure 2:
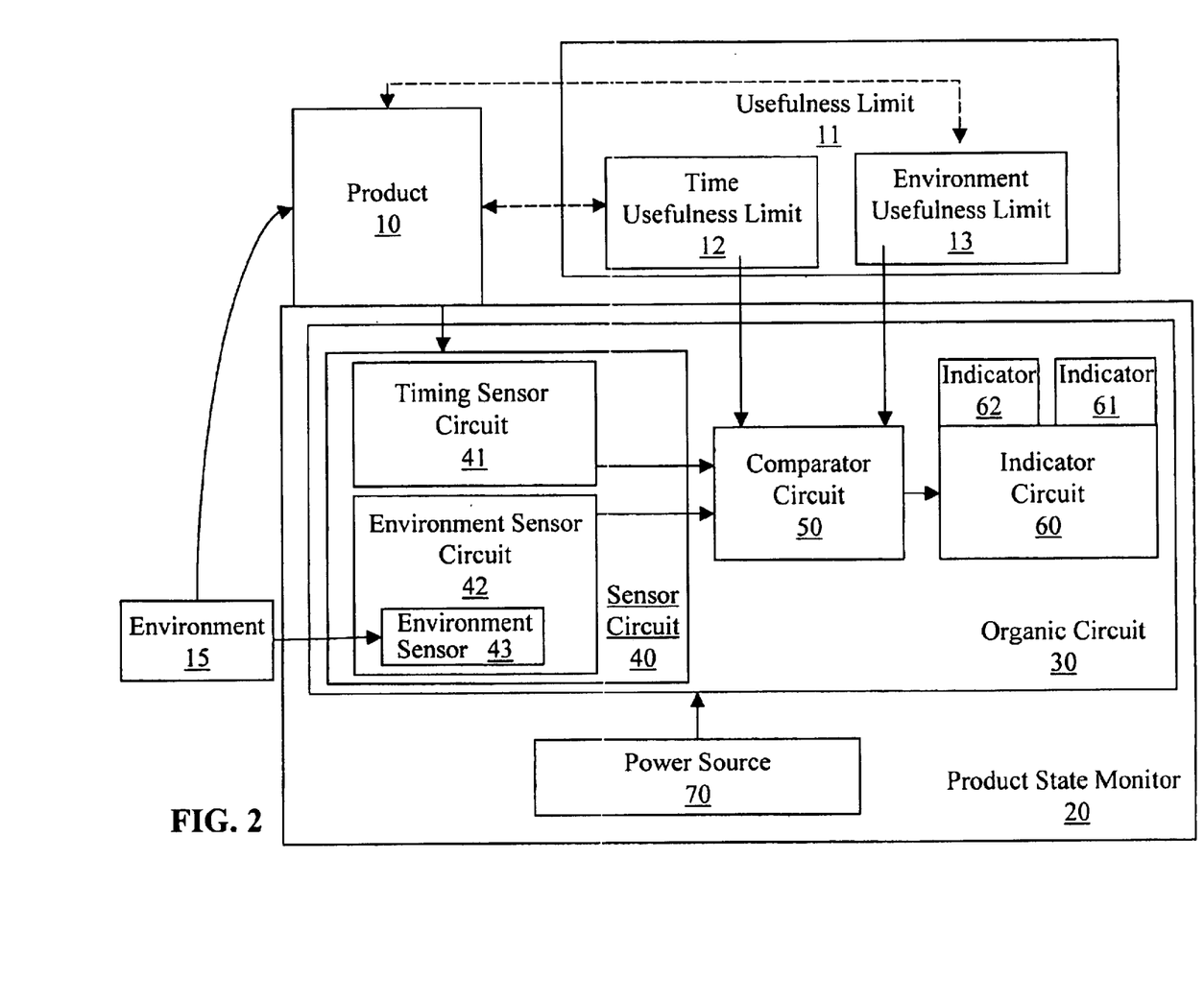
FIG. 2 illustrates in block diagram, an expanded view of the first embodiment of a product state monitor and product interaction.

FIG. 2 illustrates in block diagram an expanded view of the interactions in the first embodiment of the product state monitor 20 and product 10. In this figure the usefulness limit 11 is subdivided into two parts, a time usefulness limit 12 and an environment usefulness limit 13. The usefulness limits 12 and 13 are connected to the product 10 with dashed double-headed arrows to indicate these connections. For many products 10 the quality of the product can deteriorate based on both the time in existence and the environment. Milk is an example of such a product 10. Its quality will deteriorate if it is exposed to high temperatures for an extended period and it will gradually deteriorate to an unacceptable quality over an extended time.

To indicate the measurement of both time and environmental parameters the organic circuit 30 contains a sensor circuit 40, which comprises both a timing sensor circuit 41 and an environment sensor circuit 42. Environment sensor circuit 42 comprising an environment sensor 43 receives input from the product environment 15. The timing sensor circuit 41 measures the passage of time. The timing sensor circuit 41 and the environment sensor circuit 42 both provide product usefulness input to the comparator circuit 50. The comparison of the time usefulness limit 12 and the environment usefulness limit 13 with the product usefulness inputs from the timing sensor circuit 41 and the environment sensor circuit 42 results in a comparative value, which is used to output an indicator command to the indicator circuit 60. The indicator circuit 60 in FIG. 2 is connected to a first indicator 61 and a second indicator 62. The first indicator 61 is on and the second indicator 62 is off when the product 10 is in a state of usefulness. These indicators 61 and 62 indicate the state of usefulness of product 10 to a consumer (not shown). If the indicator circuit 60 receives an indicator command that the product 10 is no longer in a state of usefulness, then the circuit 60 will operate to change the state of the indicators 61 and 62. The indicator 61 can be a first visual indicator such as an LED or a laser diode emitting light having a first state and indicator 62 can be a second visual indicator such as electrochromic, polymer liquid crystals and polymer dispersed liquid crystals having a second state. Preferably a green LED indicator 61 indicates a good quality product and a red LED indicator 62 indicates a product 10, which is no longer in a state of usefulness. Alternately, the indicators 61 and 61 can be objects and not light. For example, the indicator 61 can also be a happy face and indicator 62 can be an unhappy face. A power source 70 supplies the needed current to the organic circuit 30. In this embodiment of sensing and evaluating both time and the environment, it is not required to have two indicators 61 and 62. As in FIG. 1 the first indicator 61 is sufficient to provide information to a consumer about the state of usefulness of the product 10. Having two indicators 61 and 62 provides additional assurance of product 10 state of usefulness and is desirable for some products. Two indicators 61 and 62 are preferable to those consumers who require additional assurance of product 10 state of usefulness. The indication of product 10 state of usefulness can be an audible signal, such as a low volume intermittent sound. In that case only one indicator 61 is required, preferably to emit a sound when the product 10 is past the state of usefulness.

Figure 3:
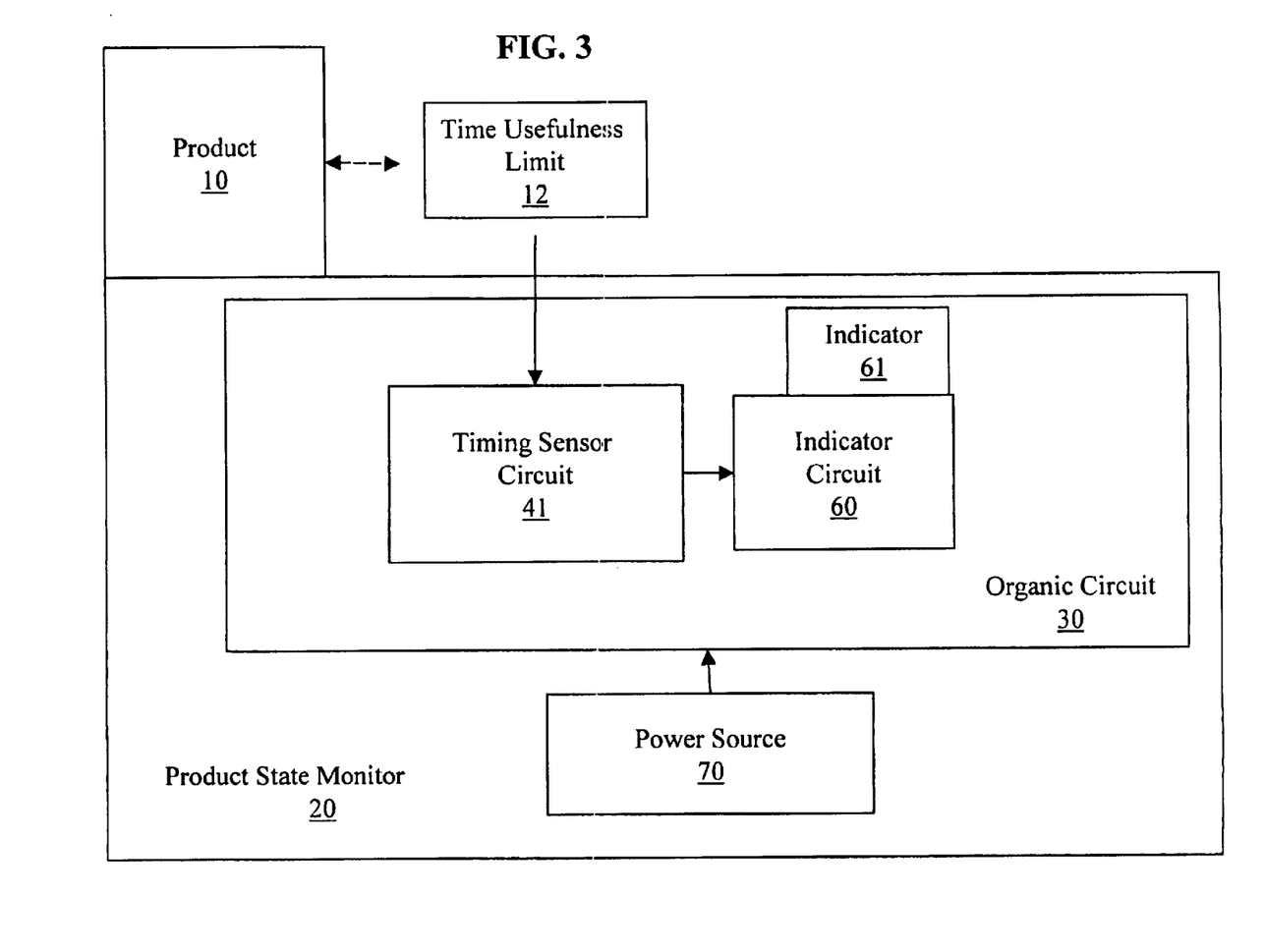
FIG. 3 illustrates in block diagram, a second embodiment of a product state monitor and product interaction.

FIG. 3 illustrates in block diagram a second embodiment of a product state monitor 20 and product 10 and their interactions. This simplified product state monitor 20 only uses the passage of time to determine the state of usefulness of product 10 so the product environment 15 from FIG. 1 and FIG. 2 is not illustrated. The time usefulness limit 12 of product 10 is now input to the timing sensor circuit 42 and the comparator circuit 50 is eliminated as a separate device from the organic circuit 30. The comparison of the passage of time with time usefulness limit 12 is now a function of the timing sensor circuit 41. The timing sensor circuit 41 includes a manner in which time passage is counted and once the time passage reaches the limit set by the time usefulness limit 12, an indicator command is sent to the indicator circuit 60 and the state of the indicator 61 is changed. The indicator 61 can be off when the product 10 has a state of usefulness or it can be on when the product 10 has a state of usefulness. The indicator 61 can be visual or audible. A power source 70 supplies the needed current to the organic circuit 30.

Figure 4:
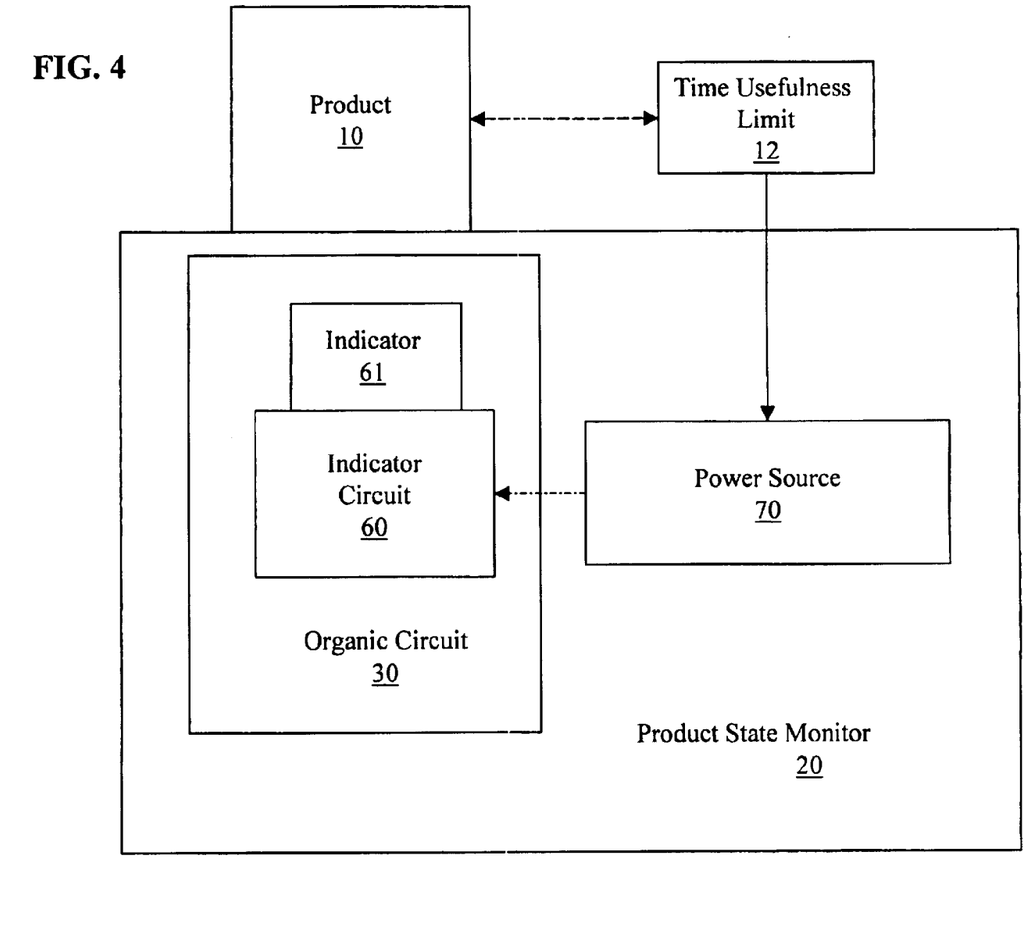
FIG. 4 illustrates in block diagram, a third embodiment of a product state monitor and product interaction.

FIG. 4 illustrates in block diagram a third embodiment of the product state monitor 20 and product 10. In this embodiment the power source 70 has a lifetime equal to that of the product 10 time usefulness limit 12. The organic circuit 30 consists of the indicator circuit 60, which electrically contacts the indicator 61 and which is driven by power source 70. The indicator 61 will be on when the product 10 has a state of usefulness and the indicator circuit 60 is a simple organic circuit to apply power from the power source 70 to the indicator 61. When the power source 70 is depleted, the indicator 61 is no longer driven by power source 70 and the indicator 61 is no longer on.

Figure 5:
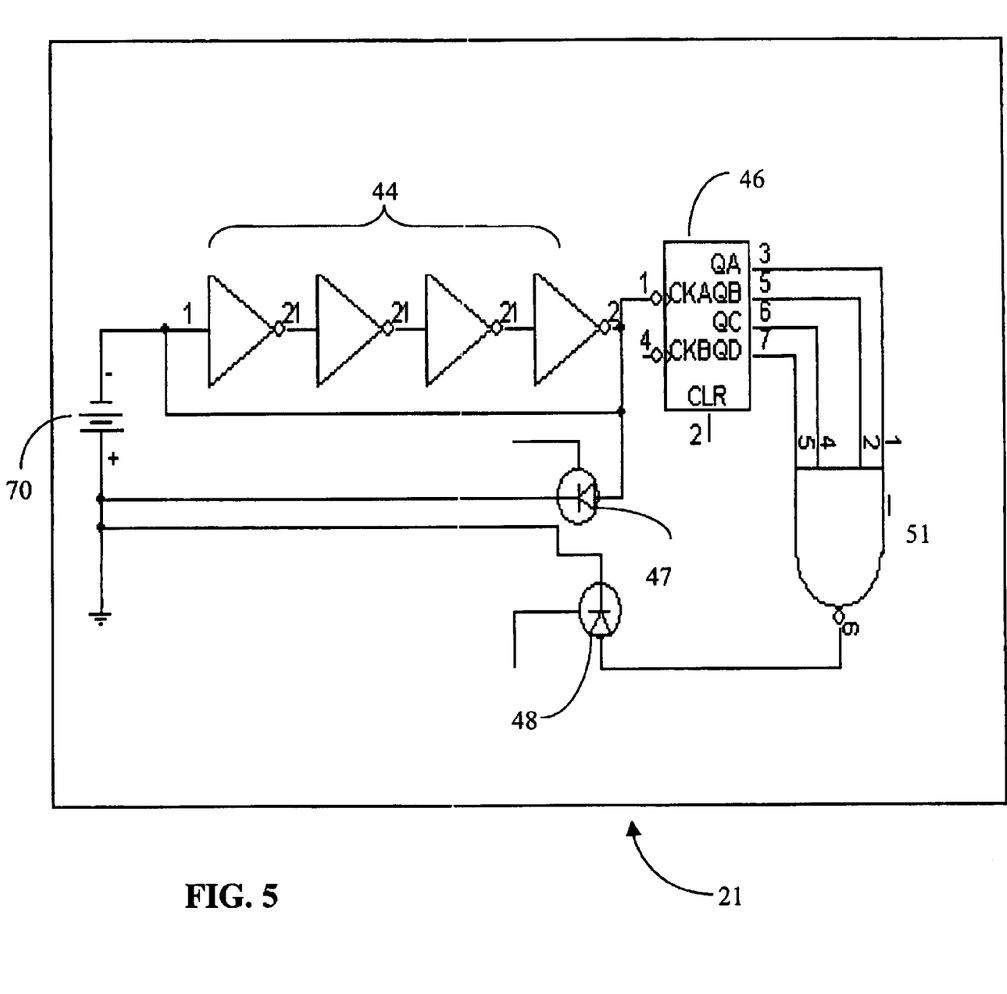
FIG. 5 illustrates schematically, a circuit for a fourth embodiment of a product state monitor.

FIG. 5 schematically illustrates a circuit 21 for a fourth embodiment of the product state monitor 20, which is a subset of the product state monitor 20 illustrated in FIG. 3. This device consists of a ring oscillator circuit 44, formed from organic semiconductor p-type logic, which pulses a counter 46 with a programmable repetition rate. Each pass through the ring oscillator circuit 44, which takes a known amount of time, advances the counter 46. The counter 46 has embedded software with a limit equal to the useful lifetime of the product or the time to expiration of the product. When the product lifetime has reached the time to expiration the counter 46 switches a suitable printed organic logic gate 51. Then the indicator 48 lights, which indicates that the useful lifetime of the product has been exceeded. Indicator 48 is equivalent to the indicator 62 of FIG. 2. Additionally, there is now no current to indicator 47, so it no longer emits any light. Preferably indicator 47 is green and indicator 48 is red. When the useful lifetime of the product is exceeded the consumer will see the red light indicating expiration of the product. In another embodiment, the counter 46 can be a sensor operable to transmit current when a programmed limit based on environmental conditions is exceeded, turning on indicator 48 as described above.

The circuit 21 is driven by a power source 70, which can be a low cost flex polymer battery, for this flexible product state monitor 20. The inverters in the ring oscillator circuit 44 are formed from organic field effect transistors (OFET), which can be fabricated using a variety of deposition or printing processes. The deposition or printing processes include, but are not limited to, microelectronics printing and graphic arts printing technologies for flexible products such as print/etch screen printing, gravine printing, flexo printing, lithographic printing, ink jetting, micro dispensing imprinting.

Figure 6:
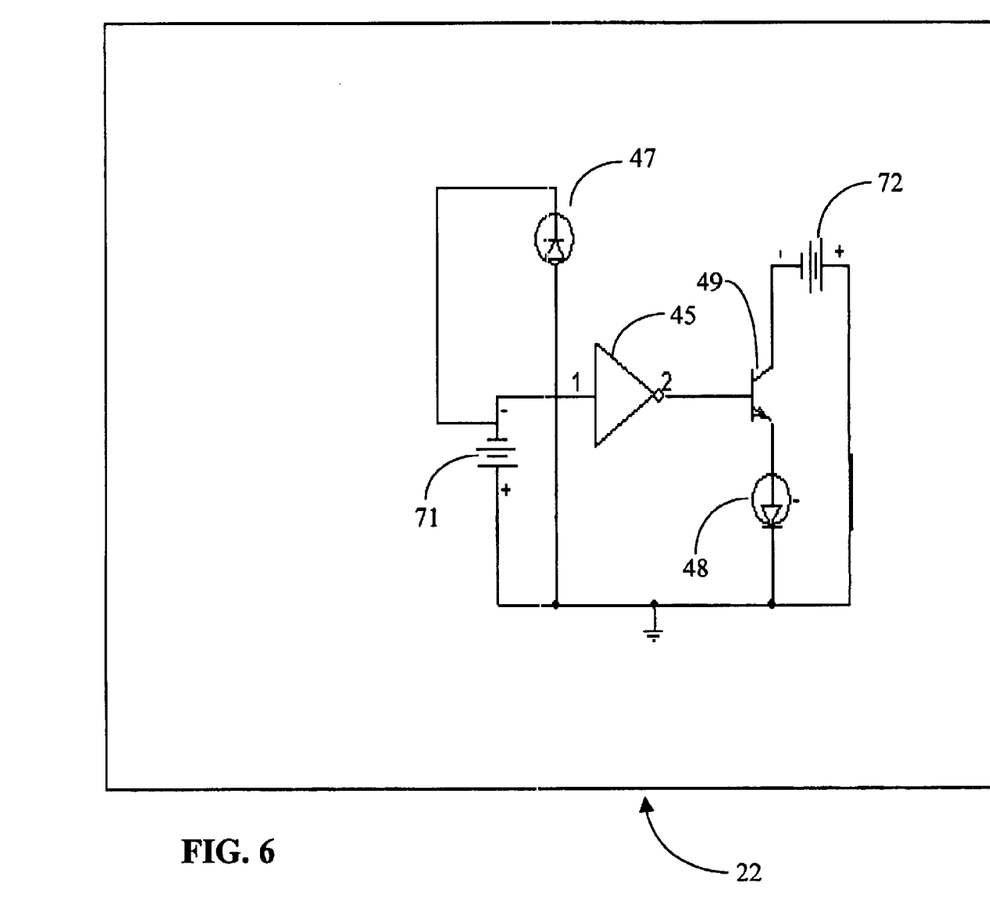
FIG. 6 illustrates schematically, a circuit in a fifth embodiment of the product state monitor.

FIG. 6 schematically illustrates a circuit 22 for a fourth embodiment of the product state monitor 20. This device uses a power supply 71 to drive a flashing indicator 47, preferably green, to indicate that the product is useful. Again, power source 71, can be a paper battery. The voltage drop across the power source 71 will gradually decrease at a predictable rate, as is known to those of ordinary skill in the art. The inverter 45 can be set to switch when the voltage to the inverter 45 drops below a programmable threshold voltage. The threshold value of the inverter 45 can be set equal to the voltage reached by power source 71 after a time equal to the useful lifetime of the product. In that case, when the expiration time of the product has elapsed, the circuit 21 will switch and the current will now flow to indicator 48, which is preferably a red LED. The current will no longer flow to indicator 47 so the green indicator 47 will stop emitting light.

The inverter 45 can also be an environment sensor made from an organic material operable to degrade over a time in a quantified manner. Again, when the useful lifetime of the product is exceeded the inverter 45 will operate to prevent current flow to the indicator 47 and start the flow of current to indicator 48 and the second power source 72. In like manner the inverter can be a sensor to determine if environmental limiting conditions of the product are exceeded. If the environment exceeds the set limitations the inverter 45 will operate to prevent current flow to the indicator 47 and start the flow of current to indicator 48 and the second power source 72.

The sensors, inverter, and FETs described here can be fabricated in a flexible form using organic semiconductor technology as taught in U.S. patent application Ser. No. 10/057,367 filed Jan. 25, 2002 (Motorola CML01491I) and U.S. patent application Ser. No. 10/034337 filed Dec. 28, 2001 (Motorola CML1500I), both applications assigned to the assignee of this application.

The illustrated embodiments of device 20 (FIG. 1–4) and the circuits 21 (FIG. 5–6) are meant to illustrate an application of making product state monitors utilizing organic semiconductor technology. These illustrative embodiments are not intended to be exhaustive of all possibilities or to limit the designs for the aforementioned purpose. There is, therefore, a multiplicity of other possible combinations and embodiments. By using what is shown and described herein, a product state monitor 20 with preprogrammed product limitations 11 and 12 can visually or audibly alert a consumer as to the state of usefulness of a product 10. The system is small, flexible and low cost and can be designed for implementation on products which have a limited lifetime or which functionally degrade outside of a range of environmental conditions.

What is claimed is:

1. A method of identifying a state of usefulness of a product using an organic circuit, the method comprising:

attaching the organic circuit to a product having a predetermined usefulness limit;

receiving at least one product usefulness input;

determining an indicator command based on the received product usefulness input and the predetermined usefulness limit; and indicating the state of usefulness of the product responsive to the determined indicator command.

2. The method of claim 1, wherein the organic circuit is comprised at least partially of organic semiconductor material.

3. The method of claim 1, wherein the organic circuit comprises a sensor circuit, operable to sense the product usefulness input, a comparator circuit, operable to compare the sensed product usefulness input and the predetermined usefulness limit of the product, an indicator circuit operable to switch at least one indicator upon input from the comparator circuit and a power source.

4. The method of claim 3, wherein the predetermined usefulness input is a time limit, and wherein the sensor circuit includes a timing circuit, operable to measure passage of time.

5. The method of claim 3, wherein the predetermined usefulness limit of a product is a time limit, wherein the power source attached to the organic circuit is preset to be depleted of power in a time equal to the time limit.

6. The method of claim 3, wherein the sensor is selected from the group consisting of a temperature sensor, humidity sensor, a pH sensor, pressure sensor, sensor for particular chemical and biological species, an ultra-violet light sensor, a vibration sensor, and a time passage sensor.

7. The method of claim 1, wherein receiving a product usefulness input comprises:
receiving input from a sensor in contact with the product.

8. The method of claim 7, wherein the sensor is selected from the group consisting of a temperature sensor, humidity sensor, a pH sensor, pressure sensor, sensor for particular chemical and biological species, an ultra-violet light sensor, a vibration sensor, and a time passage sensor.

9. The method of claim 1, wherein determining an indicator command based on the received product usefulness input and the predetermined usefulness limit comprises:
comparing the received usefulness input and the predetermined usefulness limit to provide a comparative value;
determining an indicator command based on the comparative value.

10. The method of claim 1, wherein indicating the state of usefulness of the product responsive to the determined indicator command comprises:
maintaining the state of a visual indicator when the product is determined to be useful.

11. The method of claim 1, wherein indicating the state of usefulness of the product responsive to the determined indicator command comprises:
changing the state of a visual indicator when the product is determined to be not useful.

12. The method of claim 1, wherein indicating the state of usefulness of the product responsive to the determined indicator command comprises:
changing the state of a first visual indicator having a first state when the product is determined to be not useful; and
changing the state of a second visual indicator having a second state when the product is determined to be not useful.

13. The method of claim 1, wherein indicating the state of usefulness of the product responsive to the determined indicator command comprises:
changing a state of an audio indicator when the product is determined to be not useful.

14. A device to identify a state of usefulness of a product using an organic circuit, comprising:
means for attaching the organic circuit to a product having a predetermined usefulness limit;
means for receiving a product usefulness input;
means for determining an indicator command based on the received product usefulness input and the predetermined usefulness limit; and
means for indicating the state of usefulness of the product responsive to the determined indicator command.

15. The device of claim 14, further comprising:
means for obtaining the product at the start of life of the product;
means for forming the organic circuit;
means for placing the product in contact with the organic circuit at the start of life of the product; and
means for attaching a power source to the organic circuit to initiate the organic circuit operation.

16. The device of claim 14, further comprising:
means for receiving a product usefulness input from a sensor on the organic circuit in contact with the product.

17. The device of claim 14, further comprising:
means for comparing the received usefulness input and the predetermined usefulness limit to provide a comparative value;
means for determining an indicator command based on the comparative value;
means for controlling an indicator of the state of usefulness with an indicator command.

18. The means of claim 14, further comprising:
means for turning off a first indicator to indicate a change of state of usefulness; and
means for turning on a second indicator to indicate the change of state of usefulness.

19. A computer readable medium storing a computer program comprising:
computer readable code for receiving a predetermined usefulness limit for a product;
computer readable code for receiving at least one measured product usefulness input from an organic circuit;
computer readable code for comparing the measured product usefulness input and the predetermined usefulness limit for a product;
computer readable code for calculating a comparative value based on the comparison of the measured product usefulness input and the predetermined usefulness limit for a product;
computer readable code for determining an indicator command having a first value for a first range of comparative values and having a second value for a second range of comparative values.

20. The medium of claim 19 wherein the computer readable code maintains an indicator state when the indicator command is the first value.

21. The medium of claim 19 further comprising computer readable code for changing an indicator state by modifying the organic circuit when the indicator command is the second value.

* * * * *